Figure 1:
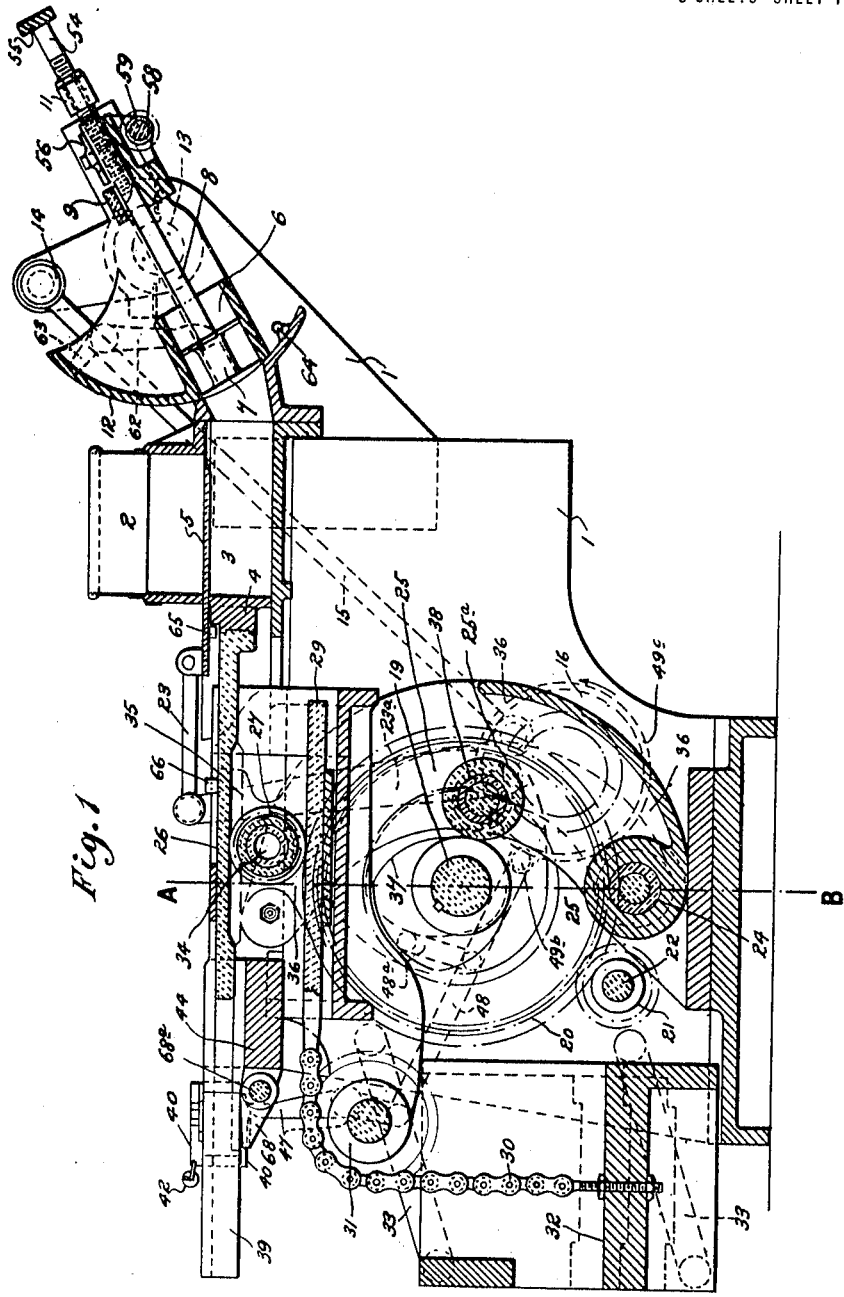

G. R. BAKER.
MACHINE FOR DIVIDING DOUGH AND LIKE PLASTIC SUBSTANCES.
APPLICATION FILED MAR. 9, 1917.

1,270,097.

Patented June 18, 1918.
3 SHEETS—SHEET 1.

Inventor:
George Ralph Baker
By his Attorney

G. R. BAKER.
MACHINE FOR DIVIDING DOUGH AND LIKE PLASTIC SUBSTANCES.
APPLICATION FILED MAR. 9, 1917.

1,270,097.

Patented June 18, 1918.

Inventor:
George Ralph Baker
By his Attorney

Inventor:
George Ralph Baker
By his Attorney

UNITED STATES PATENT OFFICE.

GEORGE RALPH BAKER, OF LONDON, ENGLAND.

MACHINE FOR DIVIDING DOUGH AND LIKE PLASTIC SUBSTANCES.

1,270,097.  Specification of Letters Patent.  Patented June 18, 1918.

Application filed March 9, 1917. Serial No. 153,617.

*To all whom it may concern:*

Be it known that I, GEORGE RALPH BAKER, a subject of the King of England, residing at London, in England, have invented certain new and useful Improvements in Machines for Dividing Dough and Like Plastic Substances, of which the following is a specification.

This invention relates to machines for dividing dough and like plastic substances and more particularly to machines of that type in which portions of dough are forced by a weight operated plunger from a hopper or equivalent compression chamber into a measuring box or boxes having means such as pistons for adjusting their capacity and usually adapted to move into and out of communication with said hopper, and wherein a differential actuating mechanism is provided for said plunger whereby variable active strokes may be imparted to the latter depending on the amount of dough remaining unforced into the measuring box or boxes.

The objects are to produce a substantially noiseless running machine, less wear of moving parts and more uniform pressure on the dough than with existing forms of machines; also to produce a structure in which the plunger-operating weight is stationary while no pressure is being exerted on the dough and one in which the weight is readily accessible.

The invention primarily consists in an improved form of differential mechanism for operating the plunger in which there are no violently contacting parts, this mechanism being operated as by a lever actuated by a cam which is always in contact therewith, and the cam being so shaped as to impart an invariable movement or throw to the free end of said lever which end is in operative connection with the plunger through said differential device, the latter comprising two racks, one connected to the plunger and the other acted on by a weight with an interposed pinion meshing with both racks and mounted for free rotation on a slide or equivalent which receives the invariable movement from the cam-operated lever, the action being such that where the full stroke of the plunger takes place in forcing the dough into the measuring box the action or drive is direct or positive and the weight takes no part therein, but where only a partial stroke of the plunger is required, due for example to the reduced capacity of the measuring box causing a quantity of dough to remain in the compression chamber, the resistance of this dough acts in reverse direction through the plunger and rack-and-pinion mechanism to lift the weight until this resistance or pressure is equalized or compensated, thus providing for a variable active stroke of the plunger according to differing quantities of dough remaining in the compression chamber notwithstanding the invariable movement imparted by the operating means.

The invention also comprises means by which further active movement of the plunger which would force the dough out of the compression chamber through its mouth when a cut-off knife is withdrawn, is arrested by a one-way gripping device which acts on a lever arm or rack connected to the plunger, this gripping device being brought into operation at definite times and being actuated, for example in timed relation with the movement of the measuring box, when the latter moves out of communication with the hopper. The gripping device however permits return of the plunger and parts of the differential device to normal position at whatever stage the stroke of the plunger may have been arrested.

The invention still further relates to means for reducing noise occasioned by the measuring box piston or pistons, comprising in connection with each piston or collectively, an air, oil or water dash-pot or buffer so arranged that the piston stem will not make violent contact with an adjustable limiting member, but will have its movement gently cushioned to the limit prescribed.

Figure 2:
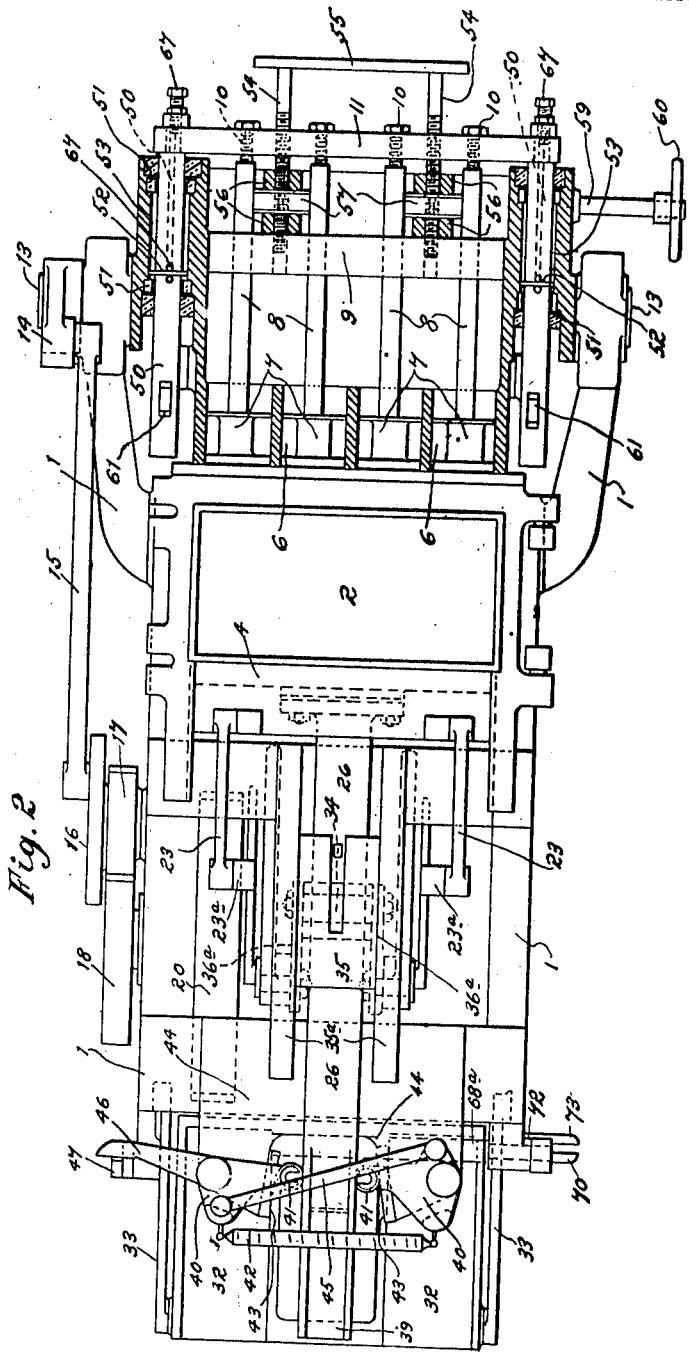
Figure 3:
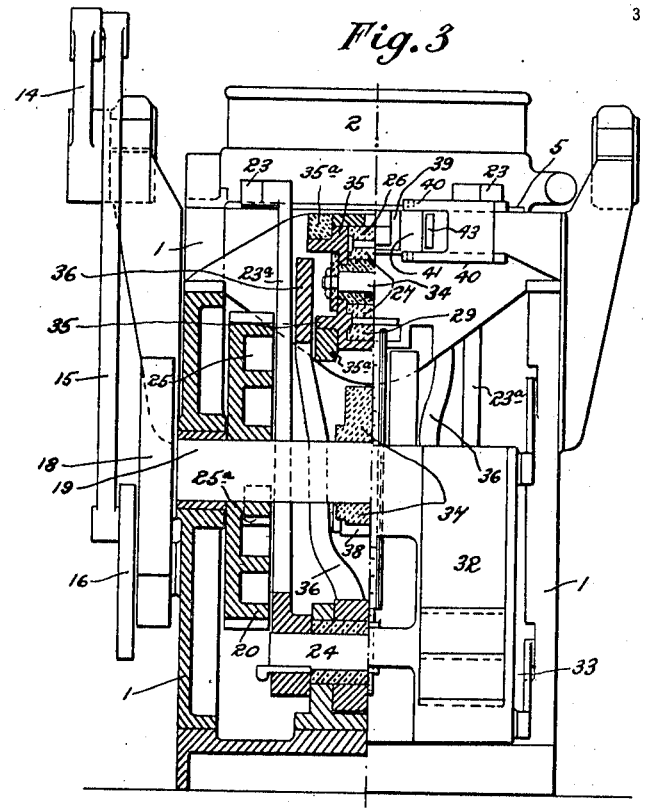
Figure 4:
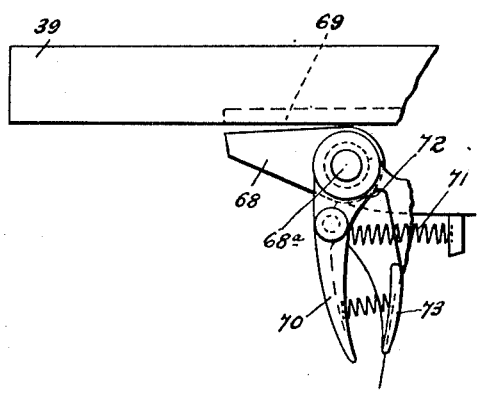

The invention is represented in the accompanying drawings wherein Figure 1 is a vertical sectional elevation of a dough dividing machine having the improvements applied thereto; Fig. 2 is a part sectional plan view of Fig. 1; Fig. 3 is a half partial end elevation and half cross section on the line A—B of Fig. 1, and Fig. 4 is a detail view hereinafter referred to.

In said drawings 1 designates the frame of the machine at the upper part of which is located the hopper 2 into which the dough to be divided is fed and passes into the compression chamber 3 to be acted on therein by the plunger 4 and portions cut off by the knife 5. The plunger forces the dough from the chamber 3 into the measuring pockets 6 containing the pistons 7, the stems 8 of which are guided in a cross-member 9 and abut against screws 10 extending through an ejector bar 11. Adjustment of the screws 10 causes the pistons 7 to be individually adjusted in their measuring pockets. The pockets 6 and appurtenant parts are carried in a segment 12 fulcrumed at 13 and actuated to rock into and out of communication with the compression chamber 3 by means of an arm 14 operated by a rod 15 connected to a crank disk 16 driven through interrupted gears 17, 18, the latter mounted on a cam shaft 19 which is driven through gears 20, 21 the latter on the driving shaft 22. The knife 5 is actuated through rods 23 and levers 23ª at each side of the machine fulcrumed to rock on a spindle 24, said levers being actuated by a box cam 25 on aforesaid cam shaft 19 by the engagement of a roller 25ª in the cam.

The mechanism so far described is known in the art and represents part of the construction of a conventional form of dough dividing machine.

To now however turn to the particular differential plunger-actuating mechanism which is the primary object of the present invention, the plunger 4 is connected to a rack 26 with which mesh the teeth of a pinion 27, the opposite side of which is also in mesh with the teeth of a rack 29, connected by a chain 30 passing over a sprocket wheel 31, with a weight 32 carried by links 33 in order that it may have vertically guided movements. The aforesaid pinion 27 is mounted to have free rotation on a spindle 34 carried in a slide 35 suitably guided as by bars 35ª for horizontal movements in either direction which are imparted thereto by means of a double lever 36 connected at its upper end to the spindle 34 by links 36ª shown in Fig. 2 and carried on the spindle 24, the lever being actuated by a cam 37 mounted on the cam-shaft 19 and in continuous contact with anti-friction means such as a roller 38 extending between the two parts of the lever whereby invariable reciprocating movements are imparted to the slide. It will thus be seen that in cases where the full stroke of the plunger 4 is required to completely empty the compression chamber 3 of dough, the plunger is positively moved forward by the racks 26 and 29, pinion 27 and weight 32, levers 36 and cam 37, the weight remaining stationary, and the return movement of the plunger is caused by the knife 5 and coöperating lugs 65, 66 hereinafter referred to, but in other cases when the incomplete stroke of the plunger takes place owing to a quantity of dough remaining in the compression chamber, the resistance of this dough against the face of the plunger will, during the continued forward movement of the slide, cause a reversal of direction of rotation of the pinion 27 through the rack teeth 26 and this reverse movement is communicated by the pinion to the rack 29 and from the latter by the chain 30 to raise the weight 32 until the resistance is compensated so that in spite of the constant amplitude of movement imparted to the slide 35, a variable compression stroke of the plunger may be effected depending on the amount of dough left in the compression chamber 3.

In order to prevent further movement of the plunger which would act to force the dough out of the mouth of the hopper when the measuring pockets are out of communication therewith and the cut-off knife is withdrawn, I provide a one-way gripping device which acts on a rearward extension 39 of the rack 26, said device comprising a pair of double plates 40 pivoted one at each side of said plunger extension in a stationary frame member 44 and each provided with a roller 41 adapted to engage the edge of same by the action of a spring 42 inter-connecting the plates and grip said extension between the rollers and inclined surfaces 43 on said frame member 44 which member passes between the double plates 40. The latter are also interconnected by a rod 45 so that they may be simultaneously brought into operation or released at definite times in relation to the operation of the measuring device and other elements of the machine, this being accomplished by means of an arm 46 connected to one of said plates 40 and extending to one side of the machine where it is engaged by one arm of a lever 47 the other arm of which is connected to a rod 48 suspended by a link 48ª and having at its end a roller 49ᵇ which engages a cam 49ᶜ on or coöperating with the crank-disk 16 in such a manner that when the measuring pockets 6 are moved downward out of communication with the compression chamber 3, the plates 40 will be free to be acted on by the spring 42 to grip the rack extension 39 and thus arrest further movement of the plunger but at all other times the plates are held out of gripping action.

At the rear end of the machine is a pawl 68 which may be operated by hand to engage a notch 69 in the plunger extension 39 (Fig. 4) in order to arrest forward movement of the plunger when no forcing action is required. The pawl is fixed on a spindle 68ª which is carried in bearings on the fixed member 44 and at one end of the spindle at the side of the machine a hand operated lever 70 is fixed, this lever being under the action of a spring 71, and carrying on it a pivoted spring-controlled finger or catch piece 73, said catch piece having a pawl tooth cut in it which engages a fixed snag 72 carried on the end bearing of the spindle 68ᵃ aforesaid.

The finger or catch piece 73 serves the purpose of holding the pawl 68 out of engagement with the extension 39 until such time as it may be desired to temporarily stop the measuring of the machine, without interfering with the action of the driving and differential mechanism which can continue running. To effect this, the operator touches the finger piece 73 to release the catch, and the pawl 68 is pressed up against the extension 39 by the action of spring 71, until the plunger comes to the back of its stroke, whereupon the pawl will engage the notch 69 and keep the plunger out of action until the operator once more pulls the lever 70 against the spring action to disengage the pawl. The notch 69 is slightly undercut so as to lock the pawl in engagement therewith except when the weight is at rest at the bottom of the stroke and exerts no pressure on the plunger bar.

To now refer to the means employed for reducing the noise produced by the piston stems 8, it will be seen that the ejector bar 11 is provided at each end, that is to say at opposite sides of the machine, with a rod 50 extending through glands 51 and carrying a piston 52 positioned within a cylinder 53 which is filled with air, gas or liquid and constitutes a dashpot. Extending loosely through the ejector bar 11 are two screwed rods 54 carrying at their outer ends a limiting bar 55, these rods being supported by and slidable in a member 56 fixed to the fulcrumed segment 12 aforesaid and carrying nuts 57 toothed on their peripheries for engagement by worm or spiral wheels 58 carried by a spindle 59 rotatable by a handwheel 60. By actuating the latter the position of the limiting bar 55 may be adjusted to or away from the ejector bar 11 to collectively control the extent of movement of the pistons 7 in the pockets 6 and the contact between the ejector bar 11 and said limiting bar on inward movement of the pistons will not be violent owing to the cushioning effect of the dash-pots, and consequently noise will be much reduced or almost entirely eliminated. Means of adjustment are provided to regulate the amount of resistance afforded by the fluid in the dash-pots as follows:

An axial hole is made in each rod 50 which is threaded to a larger diameter at the mouth, this hold extends to a point just past the piston 52 and two radial holes are drilled into it from the surface of the rod one on each side of the piston; this affords a passage way for the fluid from one side to the other of the piston. The hole down the center of the rods is blocked by an adjusting screw 67 which extends as a plain rod fitting the axial hole up to a point to almost completely block the passage way above referred to from one side to the other of the piston 52. These adjusting screws may be provided with locknuts to fix them at a required setting, and by suitable adjustment the amount of restriction for the fluid in cylinder 53 past the piston may be regulated which will control the speed at which the ejector bar will be forced back by the pressure of the dough in the measuring pockets.

The dash-pot rods 50, as shown, extend forward of the cylinders 53 and are provided each with a gap 61 in which engages a lever 62 having a snag or nose 63 which during the downward movement of the segment 12 engages a fixed abutment 64 and through said lever this returns the ejector bar 11 to normal position and consequently forces the pistons 7 outward again in their pockets 6.

In the operation of the machine the stroke of the knife 5 is obviously constant, and as aforesaid that of the plunger 4 is variable, but to insure return movement of the plunger with the knife, the latter is provided with a depending projection 65 which on return movement of the knife engages an abutment 66 on the rack 26 and thus carries the latter and the plunger along with it. At the end of the pressure stroke of the plunger the weight is in a more or less lifted position in proportion to the distance that the plunger has been stopped short of its full stroke and in the return movement of the parts to normal position the contour of the cam allows the weight 32 to fall and draw back the slide 35 and pinion 27 through the rack 29, the rack 26 and plunger 4 being returned by the knife and abutments 65, 66 as mentioned.

What I claim as my invention and desire to secure by Letters Patent of the United States is:—

1. In a dough divider the combination with a plunger and a measuring device adapted to receive dough by the action of the plunger, of means for differentially actuating said plunger comprising two racks, one connected with the plunger and the other under action of a load and a pinion interposed between said racks and meshing with both of same and means for bodily moving the pinion.

2. In a dough divider the combination with a plunger and a measuring device adapted to receive dough by the action of the plunger, of means for differentially actuating said plunger comprising two racks one connected with the plunger and the other under the action of a weight, a pinion interposed between said racks and meshing with both of same, a member on which said pinion is mounted for free rotation and means for imparting invariable amplitude of movement to said member.

3. In a dough divider the combination of a compression chamber, a plunger therein, a measuring device adapted to receive dough from said chamber by the action of the plunger, means for differentially actuating said plunger according to the amount of dough remaining in the compression chamber said means comprising two racks one connected with the plunger and the other under the action of a weight, a pinion interposed between said racks and meshing with both, a slide carrying said pinion and means for giving said slide invariable movements and means for arresting active movement of the plunger, said means permitting return of the plunger and differential actuating means to normal position in whatever position the plunger is arrested.

4. In a dough divider the combination of a plunger and relatively movable measuring device comprising pockets and pistons working therein, a movable member coöperating with said pistons to limit their inward movement and means for producing resilient or cushioning movement of said movable member.

5. In a dough divider the combination of a plunger and relatively movable measuring device comprising pockets and pistons working therein, a movable member coöperating with said pistons to limit their inward movement, means including a dash pot for producing resilient of cushioning movement of said movable member and means actuated by the movement of the measuring device for returning the pistons to normal position.

6. In a dough divider the combination of a plunger a relatively movable measuring device, two racks, one connected with the plunger and the other under the action of a load, a pinion interposed between and in mesh with both said racks, means for giving said pinion bodily movements of constant amplitude, a one-way gripping device adapted to arrest movement of said plunger and means for actuating said gripping device in timed relation with the movements of the measuring device.

7. In a dough divider the combination of a plunger, a relatively movable measuring device comprising pockets and pistons working therein, two racks one connected with the plunger and the other under action of a weight, a pinion interposed between and in mesh with both said racks, means for giving said pinion bodily movements of constant amplitude, means actuated in timed relation with the movements of the measuring device for arresting active movements of the plunger, a movable member coöperating with the measuring device pistons to limit their inward movement and means for producing resilient or cushioning movement of said movable member.

In witness whereof I have signed this specification in the presence of two witnesses.

GEORGE RALPH BAKER.

Witnesses:
M. MELLOR,
GEO. VAN DYNE.

Copies of this patent may be obtained for five cents each, by addressing the "Commissioner of Patents, Washington, D. C."